United States Patent [19]

deMey, II

[11] Patent Number: 4,684,811
[45] Date of Patent: Aug. 4, 1987

[54] FRICTIONLESS TRANSLATIONAL BEARING FOR OPTICAL INSTRUMENT ELEMENT

[75] Inventor: Charles F. deMey, II, West Redding, Conn.

[73] Assignee: The Perkin-Elmer Corporation, Norwalk, Conn.

[21] Appl. No.: 855,995

[22] Filed: Apr. 25, 1986

[51] Int. Cl.$^4$ .......................... H02K 5/16; H02K 7/08
[52] U.S. Cl. .................................... 250/561; 310/90.5
[58] Field of Search ................. 250/561; 219/121 LU, 219/121 LV, 121 LW, 121 LX; 310/90.5

[56] References Cited

U.S. PATENT DOCUMENTS 4,128,778 12/1978 Merkle et al. ..................... 310/90

Primary Examiner—David C. Nelms
Assistant Examiner—William L. Oen
Attorney, Agent, or Firm—Francis L. Masselle; Edwin T. Grimes; Ronald G. Cummings

[57] ABSTRACT

The bearing structure includes a cylindrical air bearing for supporting the optical instrument element carrier, a linear drive motor for determining the translational position of the carrier, and a frictionless magnetic repulsion positioning structure for determining the rotational versus translational position of the carrier.

11 Claims, 8 Drawing Figures

FRICTIONLESS TRANSLATIONAL BEARING FOR OPTICAL INSTRUMENT ELEMENT

BACKGROUND OF THE INVENTION

The present invention relates to translational bearing structures which are particularly useful in optical instruments such as Fourier transform infrared spectrophotometers.

In such instruments, in order to obtain accurate results, it is extremely important to provide for frictionless movement and positional control of a scanning mirror in a translational (nonrotational) mode. During such movement, the mirror must remain at precisely the same angle to the direction of racy translational movement, preferably substantially perpendicular to such movement. The accuracy of this alignment must be maintained to within very small tolerances, such as in the order of eight millionths of an inch per inch. That is, for a one inch wide reflector, the tilt of one edge with respect to the other must not exceed eight millionths of an inch.

In order to obtain such a high degree of accuracy without friction, it has been thought to be necessary to employ a rectangular cross-section air bearing to permit translation without rotation. However, a rectangular cross-section air bearing which is capable of such high accuracy must be machined very carefully, and with high accuracy, and has been found to be relatively expensive to produce.

Accordingly, it is one object of the present invention to provide an improved frictionless translational bearing for an optical instrument element which maintains a high accuracy and which is greatly reduced in cost.

It has been known that one approach to reducing the cost of a frictionless translational bearing might be to employ a circular cylinder air bearing instead of a rectangular bearing. However, when a cylindrical air bearing is employed, it is essential to restrain the bearing from rotation, or to precisely control the rotation of the bearing. This has been a difficulty in prior attempts to employ circular cylinder air bearings for such purposes. However, no truly satisfactory arrangement has been devised for the utilization of a circular air bearing.

Accordingly, it is another object of the present invention to provide an improved frictionless translational bearing for an optical instrument element which satisfactorily employs a cylindrical air bearing together with a frictionless means for preventing rotation of the optical instrument element carrier.

Further objects and advantages of the invention will be apparent from the following description and the accompanying drawings.

SUMMARY OF THE INVENTION

In carrying out the invention, there is provided a frictionless bearing structure for translational movement of an optical instrument element carrier including a cylindrical air bearing for supporting the optical instrument element carrier, a linear drive motor for determining the translational position of said carrier, and a frictionless magnetic repulsion positioning means for determining the rotational versus translational position of said carrier.

DESCRIPTION OF PREFERRED EMBODIMENTS

Figure 1:
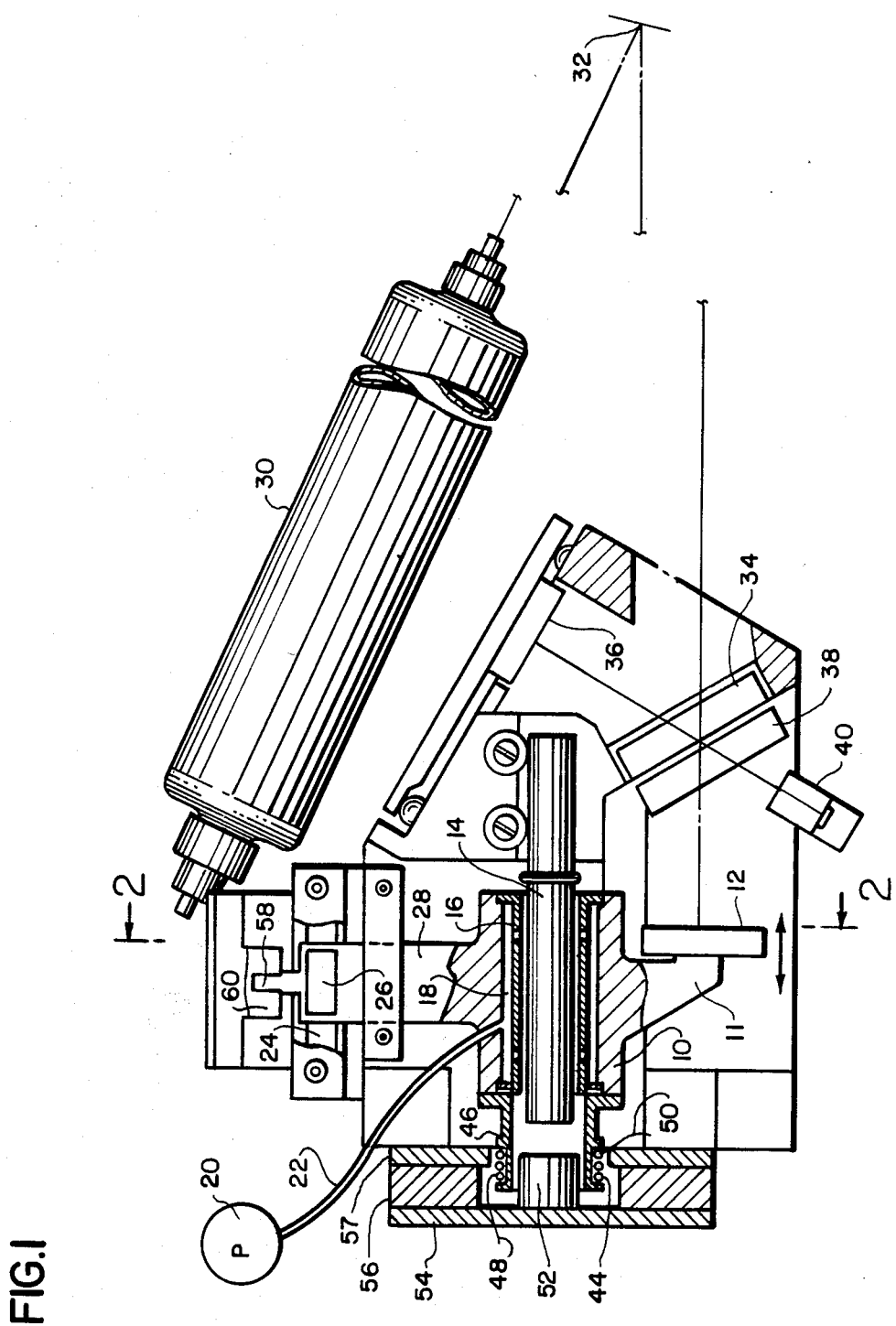
FIG. 1 is a schematic plan view, partly in section, illustrating part of a Fourier transform infrared spectrophotometer system incorporating the improved frictionless translational bearing in accordance with the present invention.

Since the invention is particularly useful in a Fourier transform infrared spectrophotometer, it is illustrated in FIG. 1 in combination in the spectrophotometer.

The spectrophotometer includes a Michelson interferometer, and it is primarily the interferometer which is illustrated in FIG. 1 in conjunction with the frictionless translation bearing. The bearing is particularly illustrated in FIG. 1 as including a carrier 10 for an optical instrument element which consists of a mirror 12 carried by an arm 11. The circular cylindrical bearing includes a support shaft 14 and an air bearing which forms a part of the carrier 10, and includes an inner sleeve member 16. The inner sleeve member 16 has a close sliding fit around the shaft 14. The space between sleeve 16 and shaft 14 is exaggerated in the drawing for clarity. In the preferred embodiment, the clearance is only in the order of one thousandth of an inch. The axial ends of the sleeve 16 are sealed to the remainder of the carrier to form a compressed air manifold within the space 18. A compressor pump 20 is connected through a conduit 22 to supply compressed air to the manifold 18. The sleeve 16 is perforated to permit air to escape from the manifold in a controlled manner into the space between the inner surface of the sleeve 16 and the exterior surface of the support shaft 14 to provide for separation of those surfaces by an air cushion for "floatation" of the carrier 10.

Rotation of the carrier 10 during translational movement is controlled by the magnetic repulsion structure including magnetic elements 24 and 26 which are associated with an arm 28 of the carrier 10. The arm 28 tends to counterbalance the arm 11 on the opposite side of the carrier 10 which carries the mirror 12, together with the weight of the mirror 12. The magnetic repulsion structure associated with the arm 28 is described more fully in conjunction with FIG. 2.

The interferometer in which the frictionless translational bearing is incorporated includes a laser light source 30, a reflector 32, a beam splitter 34, a fixed reflector 36, a light transmitting optical compensating plate 38, and the scanning (moving) reflector 12. The output beam from the interferometer is intercepted by a photodetector 40 in order to monitor the scanning movement of the reflector 12 by detection of interference fringes.

The structure includes a linear drive motor for controlling the translational movement and position of the carrier 10. That motor consists of an electromagnetic winding 44 carried by a winding spool 46 which is an integral part of the carrier 10. That winding is energized through leads schematically indicated at 48 and 50. The winding cooperates with a magnetic structure including a central magnetic core 52 joined by a yoke 54 with a toroidal magnetic stator 56 having an end plate 57. The winding 44 and the magnetic structure including members 52, 54, and 56 may be very similar to the speaker coil and the magnetic structure employed in an electromagnetic speaker used for reproduction of audible sound. The winding 44 may include many turns of fine wire. Only a few turns are indicated in the drawing for purposes of clarity.

The carrier 10 preferably has a minimum mass consistent with the requirements of rigidity and strength for the intended purpose. This permits rapid scanning of the interferometer system by rapid reciprocating movement of the carrier 10 and the reflector 12. The reflective surface of the reflector 12 is preferably perpendicular to the direction of translational movement, and thus perpendicular to the axis of the shaft 14. In practice, it is extremely difficult to make the reflective surface of the reflector 12 exactly perpendicular to the direction of translational movement. It is for this reason that it is extremely important to prevent rotation of the carrier 10 during translation. If the reflective surface is not exactly perpendicular, and the carrier 10 rotates, then the direction of the reflected beam from the reflective surface changes in response to the rotation of the reflective surface. Thus, precise control of rotation, or prevention of rotation, is very important. Prevention of rotation keeps the reflective surface at a constant angle with respect to the axis of the shaft 14.

In order to provide an additional indication of at least one translational (axial) position of the carrier 10, the carrier arm 28 preferably includes a flag device 58 which operates in conjunction with a small light source (not shown) and a photodetector 60. The photodetector 60 preferably has an aperture which is only about ten thousandths of an inch in diameter. When the flag 28 covers that aperture, a signal change is available from the photodetector 60 to the control system (not shown) to indicate that the carrier has passed the corresponding point in its travel. This signal is useful in controlling the movement of the carrier 10 and in synchronizing the operation of the system.

Figure 2:
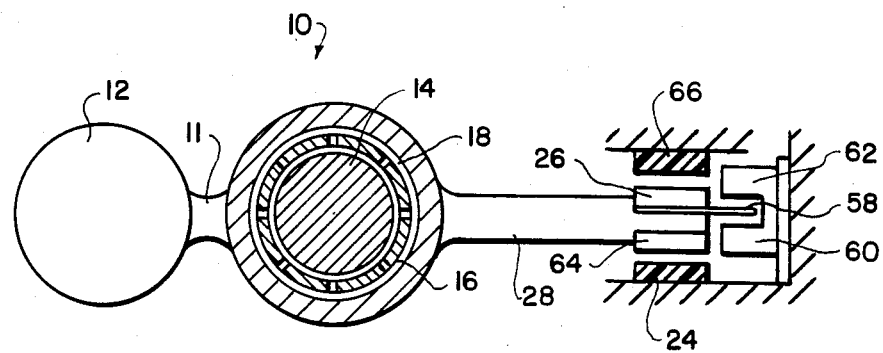
FIGS. 2, 2A, 2B and 2C are end views of that part of the system of FIG. 1 which incorporates the novel frictionless bearing structure of the present invention and particularly illustrating the magnetic elements necessary for magnetic repulsion rotational positioning of the carrier for the optical instrument element which is associated with the bearing.

FIG. 2 is an end view, partially in section, of a portion of the apparatus of FIG. 1 including the carrier 10, the carrier support shaft 14, and stationary magnets which form part of the magnetic repulsion positioning means associated with the carrier 10. Also illustrated in FIG. 2 is the flag member 58 at the end of the arm 28 and the associated photodetector 60. The light source which provides the light for the flag 58 and the photodetector 60 is indicated at 62. The light source 62 and the photodetector 60 may be part of a unitary structure, as shown. The parts illustrated in FIG. 2 are sectioned at section 2—2 of FIG. 1. The sleeve member 16 is shown in section. Sleeve member 16 is shown to define the manifold 18, and openings are shown in the sleeve for the delivery of air to the gap between the outer surface of the shaft 14 and the inner surface of the sleeve member 16.

The magnets 24 and 26 previously referred to in FIG. 1 are illustrated again in FIG. 2. The magnet 26 is carried by the arm 28. A matching magnet on the other side of the arm 28 is shown at 64. Magnet 64 is arranged to be magnetically repelled by the fixed magnet 24. Opposite the magnet 26 there is another fixed magnet 66 which repels the magnet 26. The magnetic repulsion at the magnetic gaps between magnets 24 and 64 and between the magnets 26 and 66 hold the arm 28 precisely centered between the fixed magnets 24 and 66, assuming the magnets are all of substantially the same strength.

The magnetic members 26 and 64 which are carried by the arm 28 preferably have a shorter axial length than the axial length of the fixed magnetic members 24 and 66. The fixed magnetic members 24 and 66 extend for at least the full anticipated length of travel of the carrier.

Figure 2A:
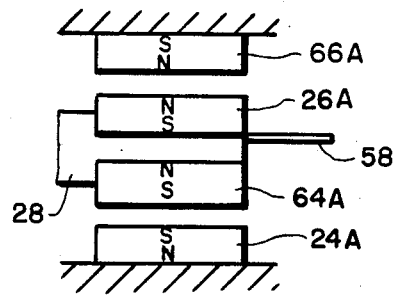

The magnets 24, 26, and 64 and 66 are carefully fabricated and assembled into the structure to assure that like poles are always positioned opposite to one another in order to provide for magnetic repulsion, rather than magnetic attraction. A number of different arrangements of the magnetic poles in the magnetic members are possible without departing from the above-mentioned principle. Three such arrangements are illustrated, for example, in the enlarged detail views of the magnets in FIGS. 2A, 2B, and 2C. For instance, in FIG. 2A, there is only one magnetic pole in each magnet face, and the facing poles in the magnetic gaps are always the same so that there will be magnetic repulsion.

Figure 2B:
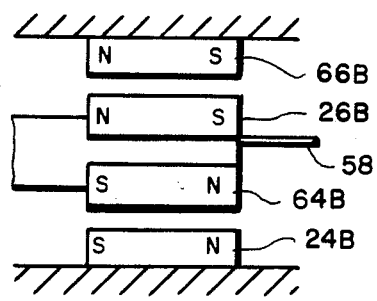

In FIG. 2B, two poles are provided in each face, but care is taken that like poles are always positioned opposite to one another to establish magnetic repulsion.

Figure 2C:
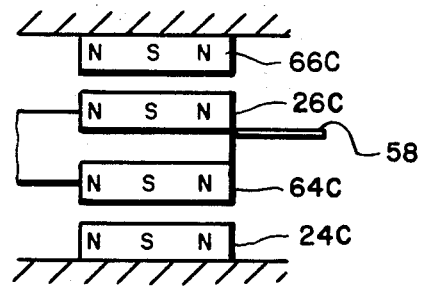

Similarly, in FIG. 2C, three poles are provided in each face. In a similar manner, more than three poles can be provided in each face. The magnetic poles, in each instance, continue along the full length of the magnetic members in a direction parallel to the axis of the bearing.

While the magnetic members may be composed of various different materials, a preferred material, and one which is readily available, consists of a flexible permanent magnetic strip formed of a synthetic resin material which is a flexible binder and which is filled with barium ferrite. The strip is preferably produced by extrusion. Such flexible permanent magnetic strip materials are available from several vendors. One such vendor is the Bunting Magnetics Company, 500 South Spencer Avenue, Newton, Kans. 67114-0468, U.S.A. Such magnetic strip materials, permanently magnetized, are available in lengths up to one hundred feet. Accordingly, there is no difficulty in producing a translational bearing in accordance with the present invention in any practical length, without any limitation with respect to the achievable length of the fixed magnetic members.

Figure 3:
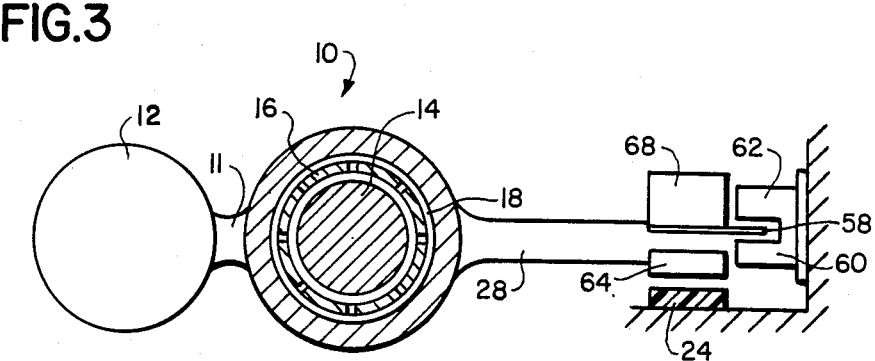
FIG. 3 is an end view corresponding to FIG. 2 and illustrating an alternative embodiment of the invention in which the rotational position of the carrier is determined by a combination of gravity force and magnetic repulsion.

FIG. 3 is an end view corresponding to FIG. 2 and illustrating an alternative embodiment of the invention in which the rotational position of the carrier is determined by a combination of gravity force and magnetic repulsion. In this embodiment, the upper fixed magnetic member 66 has been omitted, as well as the upper movable magnetic member 26. Instead, a mass 68 has been attached to the arm 28 to provide a downward force due to gravity on the arm 28. The magnetic repulsion between the movable magnetic member 64 on the arm and the fixed magnetic member 24 keeps the arm elevated to maintain an air gap between those magnetic members. Thus, the arm 28 is maintained in a predetermined rotational position by a combination of the force of gravity and magnetic repulsion force between the magnetic members 64 and 24. While this alternative embodiment is not the preferred embodiment, it does represent a workable alternative. It will be understood that the weight or mass 68 need not necessarily be a separate part, but the effect of that mass may be obtained by reproportioning the dimensions of the arm 28, or by intentionally unbalancing the carrier by moving the reflector 12 to the arm 28.

Figure 4:
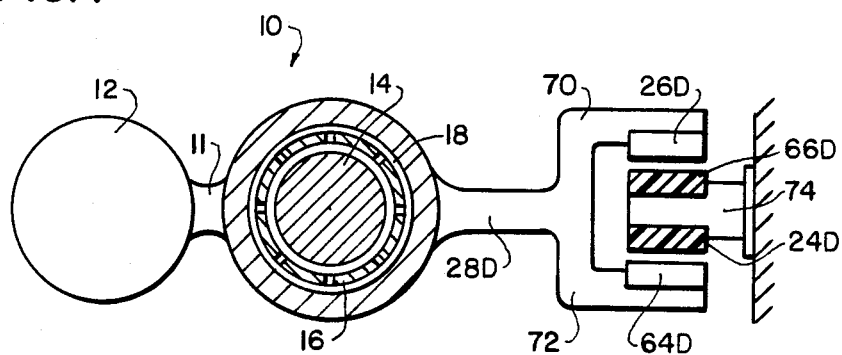
FIG. 4 is an end view corresponding to FIG. 2 and illustrating another alternative embodiment of the invention.

FIG. 4 is an end view corresponding to FIG. 2 and illustrating another alternative embodiment of the invention. In the embodiment of FIG. 4, the modified arm 28D terminates in a forklike structure having two arms 70 and 72 which respectively carry the movable magnetic elements 26D and 64D. The arms 70 and 72, and the movable magnetic elements 26D and 64D embrace a fixed rail structure 74 carrying the fixed magnetic elements 66D and 24D. As in the embodiment of FIG. 2, the arrangement of poles in the opposed magnetic structures is the same so as to provide for magnetic repulsion. Thus, the magnetic repulsion forces maintain the gaps between magnetic elements substantially equal and serve to determine the rotational position of the arm 28D and of the entire translational bearing structure 10.

In all of the various embodiments of FIGS. 2, 3, and 4, and especially in the embodiments of FIGS. 2 and 4, the rotational positioning of the arm 28 (28D) and of the translational bearing is very precise. This is true because a magnetic repulsion force between opposed magnetic elements is an inverse algebraic function of the spacing between those elements. Referring particularly to FIG. 2, if there is a tendency for the arm 28 to rotate clockwise, so that magnetic elements 64 and 24 are spaced more closely together, not only is the magnetic repulsion force between those elements substantially increased by any decrease in the gap between them, but the magnetic repulsion force between the upper magnetic elements 66 and 26 is rapidly decreased because of the increase in the gap between those elements. Accordingly, there is a strong centering force from the cumulative magnetic repulsion effects of the two pairs of magnetic elements.

Figure 5:
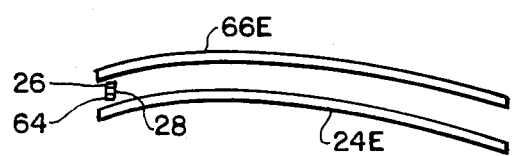
FIG. 5 is a simplified diagrammatic representation illustrating how the invention may be employed to provide a controlled rotation versus translation of the carrier for the optical element.

FIG. 5 is a simplified diagrammatic representation illustrating how the invention may be employed to provide a controlled rotation versus translation of the carrier for the optical element in accordance with the present invention. FIG. 5 is essentially an end view of the arm 28 and an edge view of the fixed magnet members 24E and 66E.

The preferred arrangement of the invention, particularly when the translational bearing is employed in a Fourier transform infrared spectrophotometer is to provide for a straight configuration of the fixed magnetic elements in planes parallel to the axis of the translational bearing so as to provide for no rotational movement of the bearing during the translational movement. However, it will be appreciated that it is possible to provide for a precisely controlled rotation of the bearing during translation if the fixed magnetic elements 66 and 24 are properly and appropriately shaped. FIG. 5 illustrates this in a very schematic form in which the fixed magnetic elements are substantially elongated, and are illustrated at 66E and 24E as each having a curved shape with varying slope. This arrangement is effective to provide a corresponding rotation of the arm 28 and the associated bearing 10 during translational movement of the bearing.

FIG. 5 implies a relatively long translational travel of the bearing. The structure of the bearing is inherently capable of extended travel length. However, in the Fourier transform infrared spectrophotometer, the length of travel may be quite short, in the order of six to ten millimeters.

The cost advantage of the present invention in providing a frictionless translational bearing is very remarkable. The cost of the cylindrical translational bearing of the invention is only about one tenth the cost of a translational bearing having a rectangular cross section.

While this invention has been shown and described in connection with particular preferred embodiments, various alterations and modifications will occur to those skilled in the art. Accordingly, the following claims are intended to define the valid scope of this invention over the prior art, and to cover all changes and modifications falling within the true spirit and valid scope of this invention.

What is claimed is:

1. A frictionless bearing structure for translational movement of an optical instrument element carrier including a cylindrical air bearing for supporting the optical instrument element carrier, a linear drive motor for determining the translational position of said carrier, and a frictionless magnetic repulsion positioning means for determining the rotational versus translational position of said carrier.

2. A bearing structure as claimed in claim 1 wherein said magnetic repulsion positioning means maintains said carrier in substantially the same rotational position for all translational positions of said carrier.

3. A structure as claimed in claim 2 wherein an optical reflector is connected to and supported upon said carrier as the optical instrument element supported thereby, said optical reflector being aligned in a plane substantially perpendicular to the axis of said bearing structure and being especially adapted to serve as a scanning reflector in a Fourier transform infrared spectrophotometer.

4. A structure as claimed in claim 1 wherein there is provided a substantially stationary cylindrical support shaft for said carrier, said cylindrical air bearing of said carrier surrounding said shaft, said cylindrical air bearing including an inner bearing cylinder which has a loose fit around said shaft, said inner cylinder including perforations therein for the admission of air to the space between said inner cylinder and said shaft, said inner cylinder and the remaining structure of said carrier device defining a compressed air manifold substantially surrounding the outside surface of said inner cylinder, means connecting a source of compressed air to said manifold to supply air under pressure through said perforations to the space between the inner surface of said inner cylinder and said support shaft.

5. A structure as claimed in claim 1 wherein said frictionless magnetic repulsion positioning means comprises a radial arm attached to said carrier, said arm including a first magnetic assembly comprising at least one magnetic element, a second magnetic assembly comprising at least one cooperating fixed magnetic element positioned adjacent to said arm magnetic element and having like magnetic poles facing one another for determining the rotational position of said carrier by magnetic repulsion.

6. A structure as claimed in claim 5 wherein one of said magnetic assemblies comprises a single structural member having two magnetic elements positioned on opposite sides thereof and having magnetic pole faces arranged in planes substantially parallel to the axis of said cylindrical air bearing, and wherein the other one of said magnetic assemblies comprises two magnetic element supporting members attached to a common support and positioned on opposite sides of the magnetic elements of said previously mentioned magnetic assembly and including magnetic elements positioned on opposite sides of said single structural member and having like magnetic poles facing like magnetic poles of said magnetic elements of said previously defined magnetic assembly for mutual positioning of said magnetic assemblies by magnetic repulsion forces.

7. A structure as claimed in claim 6 wherein said second magnetic assembly is the magnetic assembly having a single support member and said support member is fixed in position and wherein said first magnetic assembly is the magnetic assembly having said two support members, said two support members comprising a part of said radial arm.

8. A structure as claimed in claim 6 wherein said first magnetic assembly is the magnetic assembly having a single support member and said support member comprises a part of said radial arm, and wherein said second magnetic assembly is the magnetic assembly having said two support members, said two support members being fixed in position.

9. A structure as claimed in claim 8 wherein said magnetic elements of said second magnetic assembly comprise elongated magnetic strips which are magnetized to provide elongated magnetic poles which are aligned in the longitudinal direction of said strips.

10. A structure as claimed in claim 8 wherein said carrier includes a second radial arm extending on the side opposite to said first mentioned radial arm, an optical reflector connected to and supported upon said second radial arm as the optical instrument element supported by said carrier, said optical reflector being aligned in a plane substantially perpendicular to the axis of said bearing structure and being especially adapted to serve as a scanning reflector in a Fourier transform infrared spectrophotometer.

11. A structure as claimed in claim 10 wherein said first-mentioned radial arm includes a flag device extending outwardly therefrom, and in which there is included a photodetector device operable in conjunction with said flag device for determining at least one translational position of said carrier in terms of the position of said flag device.

* * * * *